United States Patent
Brady

(10) Patent No.: US 8,816,016 B2
(45) Date of Patent: Aug. 26, 2014

(54) REDUCED CORROSION CURABLE COMPOSITION

(75) Inventor: Jean Marie Brady, Maple Glen, PA (US)

(73) Assignee: Rohm and Haas Company, Philadelphia, PA (US)

( * ) Notice: Subject to any disclaimer, the term of this patent is extended or adjusted under 35 U.S.C. 154(b) by 1072 days.

(21) Appl. No.: 12/283,051

(22) Filed: Sep. 9, 2008

(65) Prior Publication Data

US 2010/0062167 A1    Mar. 11, 2010

(51) Int. Cl.
  *C08F 283/00* (2006.01)
  *C08G 18/62* (2006.01)
  *B05D 3/02* (2006.01)

(52) U.S. Cl.
  USPC .......... 525/418; 427/385.5; 525/419; 525/451

(58) Field of Classification Search
  USPC ........................................ 427/385.5
  See application file for complete search history.

(56) References Cited

U.S. PATENT DOCUMENTS

| | | |
|---|---|---|
| 4,179,417 A | 12/1979 | Sunada et al. |
| 5,670,585 A | 9/1997 | Taylor et al. |
| 6,136,916 A | 10/2000 | Arkens et al. |
| 6,262,159 B1 | 7/2001 | Dreher et al. |
| 6,274,661 B1 | 8/2001 | Chen et al. |
| 6,299,936 B1 | 10/2001 | Reck et al. |
| 6,331,350 B1 | 12/2001 | Taylor et al. |
| 6,348,530 B1 | 2/2002 | Reck et al. |
| 6,841,608 B1 | 1/2005 | Dreher et al. |
| 7,199,179 B2 | 4/2007 | Clamen et al. |
| 2004/0082726 A1 | 4/2004 | Rodrigues et al. |
| 2005/0048212 A1 | 3/2005 | Clamen et al. |
| 2007/0010651 A1 * | 1/2007 | Finch et al. ............. 528/310 |
| 2008/0152817 A1 | 6/2008 | Kelly |

FOREIGN PATENT DOCUMENTS

| | | |
|---|---|---|
| DE | 19729161 A1 | 1/1999 |
| EP | 1935933 A1 | 6/2008 |
| GB | 1277877 | 6/1972 |

* cited by examiner

*Primary Examiner* — Peter F Godenschwager
*Assistant Examiner* — David Karst
(74) *Attorney, Agent, or Firm* — Andrew E. C. Merriam

(57) ABSTRACT

A curable composition, useful as a thermosetting binder, having an emulsion (co)polymer, a polyol, and a water soluble polyacid or salt thereof.

9 Claims, No Drawings

REDUCED CORROSION CURABLE COMPOSITION

This invention relates to a formaldehyde-free curable aqueous composition with reduced corrosivity in processing, and its use as a binder for heat-resistant non-wovens.

Nonwoven fabrics are composed of fibers which may be consolidated by purely mechanical means such as, for example, by entanglement caused by needle-punching, by an air-laid process, and by a wet-laid process; by chemical means such as, for example, treatment with a polymeric binder; or by a combination of mechanical and chemical means before, during, or after non-woven fabric formation. Binders for non-woven materials have mostly contained resins, such as formaldehyde condensate resins that include urea-formaldehyde (UF), phenol-formaldehyde (PF), and melamine-formaldehyde (MF). However, formaldehyde is a known carcinogen, so users of formaldehyde containing resins are looking for better alternatives. Further, such resins tend to yellow when subjected to high temperatures.

Curable compositions containing little or no formaldehyde are desirable in a variety of products, for obvious reasons. Existing commercial formaldehyde-free binders use polymers predominantly composed of carboxylic acid monomers, and a polyol that esterify and form a thermoset polymer when heat cured. End products that require a greater degree of flexibility have also made use of curable compositions that include a latex emulsion (co)polymer.

U.S. Pat. No. 6,262,159 describes polymer dispersions which contain dispersed particles, a dissolved polymer, and a specific surface-active alkoxylated long-chain amine, such dispersions being heat curable. The dissolved polymer contains in polymerized form from 60 to 100% by weight of at least one ethylenically unsaturated mono- or dicarboxylic acid, or salts thereof, and the weight ratio, based on solids, of the dissolved polymer to the dispersed particles is in the range from 7:1 to 1:7, preferably 3:1 to 1:3. Thus, large quantities of the water soluble high acid species are required.

However, the above water soluble acid-containing systems can be problematic for manufacturers since the latter generally utilize wash water systems to remove excess binder from the equipment used to form the coated fibers (see, for example, U.S. Patent Application No. 2003/0221458). Preferably, the wash water is recycled; however, the reclaim water can become more acidic as the number of cycles increases. This acidic wash water can corrode the walls of the forming and wash water equipment, which is typically made of carbon steel, unless further efforts are made to limit corrosion.

Thus, this inventive composition meets the need for new formaldehyde-free binders for making a heat-resistant non-woven fabric with reduced corrosivity in processing.

This invention is an aqueous thermosetting composition comprising (a) polymer particles of at least one emulsion (co)polymer comprising greater than 10% by weight of one or more monomers comprising carboxylic acid groups, anhydride groups, or salts thereof; (b) at least one polyol, wherein the polyol has a formula molecular weight of less than 2000 and at least two hydroxyl groups, and wherein the ratio of the number of equivalents of hydroxyl groups of said polyol to the number of equivalents of said carboxylic acid groups, anhydride groups, or salts thereof of said at least one emulsion (co)polymer is from 10/1 to 1/10; and (c) at least one water-soluble polyacid or salt thereof, in an amount no greater than 10%, by weight based on the sum of the weight of the emulsion (co)polymer (a) and the weight of the water-soluble polyacid or salt thereof, all weights being taken on a solids basis; wherein the aqueous thermosetting composition has a weight ratio of (a) to combined weights of (a), (b), and (c), of greater than 0.5:1.0, based on the weights of solids of each component; and wherein the pH of the aqueous thermosetting composition is no greater than 7.5.

Preferably, the ratio of the number of equivalents of said hydroxyl groups to the number of equivalents of said carboxylic acid groups, anhydride groups, or salts thereof of the emulsion (co)polymer is from 10/1 to 1/10, more preferably from 5/1 to 1/5, still more preferably from 2.5/1 to 1/2.5.

Preferably, the aqueous thermosetting composition has a weight ratio of polymer particles of the emulsion (co)polymer (a) to combined weights of components (a), (b), and (c), of greater than 0.5:1.0, more preferably greater than 0.7:1.0, or even greater than 0.8:1.0, based on the weights of solids of each component.

For optimum corrosion resistance, the water-soluble polyacid species of the aqueous thermosetting composition is present preferably in an amount of 10% or less, or 7% or less, or more preferably 0.5% to 5%, and in some cases advantageously in an amount of approximately 1%, by weight based on the sum of the weight of the latex emulsion (co)polymer (a) and the weight of the water soluble polyacid species (c), all weights being taken on a solids basis.

Preferably, the emulsion (co)polymer (a) of the aqueous thermosetting composition has a glass transition temperature, Tg, of less than 90° C., as determined by the Fox equation.

In one embodiment, the water-soluble polyacid or salt thereof (c) is selected from the group consisting of water-soluble polycarboxy (co)polymers; polybasic carboxylic acids; phosphorous-acids; salts thereof; and mixtures thereof. In one embodiment, the water-soluble polyacid or salt thereof (c) is a poly(meth)acrylic acid species. In another embodiment, the water-soluble polyacid or salt thereof (c) is selected from the group consisting of phosphorous-acids and their salts, citric acid and its salts, and mixtures thereof.

In another embodiment, the polyol (b) is selected from the group consisting of β-hydroxyalkylamides, dialkanolamines, trialkanolamines, dialkanols, and trialkanols. In one such embodiment, the polyol (b) is the β-hydroxyalkylamide resulting from the adduct of caprolactone and diethanolamine.

In another embodiment, the aqueous thermosetting composition further comprises a phosphorous-containing accelerator such as those disclosed in U.S. Pat. No. 5,661,213.

In yet another embodiment, the components (a), (b) and (c) of the aqueous thermosetting composition together make up at least 50 weight % of the total solids of the aqueous thermosetting composition.

The composition provides a formaldehyde-free binder useful for making heat resistant nonwovens with good flexibility and wet strength and reduced tendency to corrode the metal processing equipment.

This invention also is a method for treating substrates with such a composition, which includes forming an aqueous thermosetting composition comprising admixing the components of the invention with water or one or more aqueous solvent, contacting said substrate with the aqueous thermosetting composition or, alternatively, applying the aqueous thermosetting composition to the substrate; and heating the aqueous thermosetting composition at a temperature of from 100° C. to 400° C. This method can be used to treat substrates such as fibrous articles, non-woven articles or composites.

Preferably, the polymer particles of the emulsion (co)polymer (a) are stabilized with acid-functional monomers. Preferably, the latex emulsion (co)polymer (a) of the curable aqueous composition is an addition polymer or copolymer comprising at least one copolymerized ethylenically unsaturated carboxylic acid-containing monomer.

As used herein, the term "acid-functional monomer" refers to ethylenically unsaturated monomers containing acid groups or their salts. This includes monomers containing carboxylic acid groups.

As used herein, the term "polyacid" refers to acid dispersants and is defined as polycarboxy (co)polymers, polybasic acids, and phosphorous-acids and their salts.

When we refer to "(co)polymer" we refer to either a homopolymer or copolymer, or both of them in combination. We use the term "(meth)acrylate" to refer to either acrylate or methacrylate and the term "(meth)acrylic" refers to either acrylic or methacrylic.

As used herein, the term "polycarboxy (co)polymer" is an oligomer, co-oligomer, polymer or copolymer with at least two carboxylic acid functional groups, anhydride groups, or salts thereof.

As used herein, the phrase "polybasic" means having at least two reactive acid functional groups or anhydrides or salts thereof (see e.g. *Hawley's Condensed Chemical Dictionary*, 14$^{th}$ Ed., 2002, John Wiley and Sons, Inc.).

"Formula molecular weight" is the weight of the molecule, in atomic mass units, and is calculated as the sum of the atomic weights (in atomic mass units) of all of the atoms that make up the structural formula of the molecule.

The endpoints of all ranges directed to the same component or property are inclusive of the endpoint and independently combinable.

In a preferred embodiment, the curable (co)polymer composition is a curable aqueous-based composition. "Aqueous" as used herein includes water, and mixtures of water and water-miscible solvents. In this embodiment, the water-soluble polyacid species (c) may be a in the form of a solution of an addition polymer in an aqueous medium such as, for example, a polyacrylic acid homopolymer or an alkali-soluble resin which has been solubilized in a basic medium.

"Glass transition temperature" or "$T_g$" is the glass transition temperature, of a copolymer calculated with the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, based on weight of monomers charged to the reaction vessel, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The glass transition temperatures of homopolymers for the purposes of this invention are those reported in "Polymer Handbook", edited by J. Brandrup and E. H. Immergut, Interscience Publishers, 1966, unless that publication does not report the Tg of a particular homopolymer, in which case the Tg of the homopolymer is measured by differential scanning colorimetry (DSC). To measure the glass transition temperature of a homopolymer by DSC, the homopolymer sample is prepared and maintained in the absence of ammonia or primary amine. The homopolymer sample is dried, preheated to 120° C., rapidly cooled to −100° C., and then heated to 150° C., at a rate of 20° C./minute while data is collected. The glass transition temperature for the homopolymer is measured at the midpoint of the inflection using the half-height method.

The Fox calculation of the $T_g$ for a copolymer containing crosslinking monomers as polymerized units, is based on glass transition temperatures for the homopolymers formed from each crosslinking monomer wherein the homopolymer is not in the presence of ammonia or a primary amine. The glass transition temperature values for homopolymers formed from the anionic monomers are for anionic homopolymers in the acid form.

For the case in which the emulsion (co)polymer particles are made up of two or more mutually incompatible (co) polymers, the Tg is calculated for each (co)polymer phase according to the component monomers present in each (co) polymer.

The polymer particles of at least one emulsion (co)polymer (a) are latex emulsion (co)polymers comprising greater than 10% by weight of one or more monomers comprising carboxylic acid groups, anhydride groups, or salts thereof, and result from emulsion polymerization processes, as described below.

The one or more polyol (b) functions as a crosslinker since it undergoes a condensation reaction with acid functionality to form ester linkages. The one or more polyol (b) preferably contains three or more hydroxyl groups, i.e. is a trihydric polyol; however it may contain two hydroxyl groups. These polyols may also contain amine or amide functionality. The polyol must be sufficiently nonvolatile that it will substantially remain available for reaction with the polyacid in the composition during heating and curing operations. The polyol may be one or more compound bearing at least two hydroxyl groups chosen from, for example, (poly)ethylene glycol, diethanolamine (DEOA), glycollated ureas, 1,4-cyclohexane diol, resorcinol, catechol, and $C_3$ to $C_8$ (poly)alkylene glycols; one or more trihydric polyols which contain three or more hydroxyl groups, such as glycerol, trimethanol propane (TMP), trimethanolethane, pentaerythritol, sorbitol, triethanolamine (TEOA), 1,2,4-butanetriol, poly(vinyl alcohol), partially hydrolyzed poly(vinylacetate), sorbitol, sucrose, glucose, pyrogallol, propoxylated trimethylol propane, propoxylated pentaerythritol, β-hydroxyamides of the following Formula (I)

(I)

in which formula, R and R" independently represent H, or monovalent $C_1$ to $C_{18}$ linear or branched alkyl radicals which may contain aryl, cycloalkyl and alkenyl groups; R' represents a divalent $C_1$ to $C_5$ alkylene radical or a covalent bond; y is the integer 1, 2, or 3; x is 1 or 2, such that (x+y)=2 or 3; and mixtures thereof. Other suitable trihydric polyols having at least three hydroxyl groups may comprise reactive polyols such as, for example, β-hydroxyalkylamides such as, for example, bis-[N,N-di(β-hydroxyethyl)]adipamide, as may be prepared according to the teachings of U.S. Pat. No. 4,076,917; addition (co)polymers containing at least two hydroxyl groups such as, for example, polyvinyl alcohol, partially hydrolyzed polyvinyl acetate, and addition homopolymers or copolymers comprising the polymerization product of hydroxyl group containing monomers; or mixtures and combinations thereof. Preferably, the one or more polyol comprises a trihydric polyol or a dihydric polyol of formula (I) or the related β-hydroxyalkylamides. Examples of the latter include the adduct resulting from the reaction of caprolactone and diethanolamine, HO—$(CH_2)_5C(O)N(CH_2CH_2OH)_2$, referred to herein as Amide1; and the adduct resulting from the reaction of butyrolactone and diethanolamine, HO—$(CH_2)_3C(O)N(CH_2CH_2OH)_2$, referred to herein as Amide2. Preferred trihydric alcohols are glycerol, TEOA, TMP, trihydric β-hydroxyamides of formula (I), trihydric β-hydroxyalkylamides including Amide1 and Amide2, and mixtures thereof.

The polyol (b) may be a compound having a formula molecular weight of less than about 2000, or less than about 1000, or less than about 500, bearing at least two hydroxyl groups.

The water-soluble polyacid species (c) is added at a low level and functions as a dispersant in achieving uniform low dynamic corrosion rates on mild stainless steel. Herein, low dynamic corrosion rates are less than about 30 mil/yr, and most preferably less than about 15 mil/yr, when subjected to 0.5% solids solution of binder under constant agitation as described below in Example 4.

In one embodiment, the water soluble polyacid species (c) is a polycarboxy (co)polymer which contains at least two carboxylic acid groups, anhydride groups, or salts thereof. Ethylenically unsaturated carboxylic acids such as, for example, methacrylic acid, acrylic acid, crotonic acid, fumaric acid, maleic acid, 2-methyl maleic acid, itaconic acid, 2-methyl itaconic acid, α,β-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof, at a level of from about 1% to 100%, by weight, based on the weight of the addition polymer, may be used. Additional ethylenically unsaturated monomer, as listed below, may also be present.

In a preferred embodiment the water soluble polyacid is in the form of a solution of the polycarboxy (co)polymer in an aqueous medium such as, for example, a polyacrylic acid homopolymer or an alkali-soluble resin which has been solubilized in a basic medium, the weight average molecular weight may be from about 300 to about 20,000. Preferred is a molecular weight from about 300 to about 3,000.

In one such embodiment, the polycarboxy addition (co) polymers may be oligomers or co-oligomers of ethylenically-unsaturated carboxylic acids prepared by free radical addition polymerization, having a number average molecular weight of from 300 to 1000. In another embodiment, the polyacid species is a polyacrylic acid homopolymer (pAA) for which a weight average molecular weight of no greater than 20,000, is suitable, more preferably no greater than 5,000, even more preferably no greater than 3,000, and with 500-2,000 or 2,000-3,000 being advantageous. Many commercial dispersants and species of similar composition can function as the polyacid (c). The polyacids used as additives in these compositions can be neutralized with $NH_4OH$ if desired. The addition of unneutralized polyacid to latexes can result in increased viscosities, in some cases.

In another embodiment, the polyacid dispersant comprises one or more low molecular weight polybasic carboxylic acid, anhydride or salt thereof having a molecular weight of 1000 or less, preferably 500 or less, and most preferably 200 or less. Examples of suitable low molecular weight polybasic carboxylic acids and anhydrides include, for example, maleic acid, maleic anhydride, fumaric acid, succinic acid, succinic anhydride, sebacic acid, azelaic acid, adipic acid, citric acid, glutaric acid, tartaric acid, itaconic acid, trimellitic acid, hemimellitic acid, trimesic acid, tricarballytic acid, 1,2,3,4-butanetetracarboxylic acid, pyromellitic acid, oligomers of carboxylic acid, and the like. Preferably, the polybasic carboxylic acid is maleic acid or, more preferably, citric acid.

Additional polyacid dispersant species include phosphate-based or other phosphorous-containing acids and salts, such as phosphoric acid and its salts. These are referred to herein as phosphorous-acids and their salts.

In another embodiment, the water-soluble polyacid (c) comprises a mixture of the polyacid dispersants described herein.

Polycarboxy (co)polymer molecular weights reported herein, unless otherwise indicated, are weight average molecular weights, Mw, as measured by gel permeation chromatography (GPC) using polystyrene standards, or polyacrylic acid standards, as is known in the art. However, number average molecular weights, Mn, may be considered to be more meaningful at low molecular weights for which Mw is about 1,000 or less. In such cases, GPC measurements can still be used, although polyacrylic acid standards may be more suitable for calibration purposes. For aqueous solutions, such as the homopolymer polyacrylic acid (pAA) mentioned above, the GPC standard is a polyacrylic acid standard, as is generally used in the art. The molecular weights reported herein, for Mw or Mn, are in daltons.

The latex emulsion (co)polymer (a) may be prepared by free radical emulsion polymerization, a technique which is well known in the art. "Emulsion polymer", or "emulsion (co)polymer", means a (co)polymer dispersed in an aqueous medium that has been prepared by emulsion polymerization techniques known in the art as is discussed in detail in D. C. Blackley, *Emulsion Polymerization* (Wiley, 1975) and also in H. Warson, *The Applications of Synthetic Resin Emulsions*, Chapter 2 (Ernest Benn Ltd., London 1972). By "nonionic monomer" herein is meant that the copolymerized monomer residue does not bear any substantial ionic charge between pH=1-14. It is particularly advantageous that the cured thermoset composition has both flexibility and strength. The emulsion polymer preferably has a Tg of less than 90° C. For some applications, the emulsion polymer preferably has a Tg of less than 75° C., or less than 50° C., or even less than 40° C., less than 25° C., or even less than 0° C.

The ethylenically-unsaturated nonionic acrylic monomers of the latex emulsion (co)polymer may include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate; hydroxyalkyl(meth)acrylate monomers such as 2-hydroxyethyl methacrylate, 2-hydroxyethyl acrylate, 2-hydroxypropyl methacrylate, 1-methyl-2-hydroxyethyl methacrylate, 2-hydroxypropyl acrylate, 1-methyl-2-hydroxyethyl acrylate, 2-hydroxybutyl methacrylate and 2-hydroxybutyl acrylate. Other ethylenically-unsaturated nonionic monomers which may be incorporated into the polymer include vinylaromatic compounds, such as styrene, α-methylstyrene, p-methylstyrene, ethylvinylbenzene, vinylnaphthalene, vinylxylenes, vinyltoluenes, and the like; vinyl acetate, vinyl butyrate and other vinyl esters; vinyl monomers such as vinyl alcohol, vinyl chloride, vinyl toluene, vinyl benzophenone, and vinylidene chloride.

Further ethylenically-unsaturated nonionic acrylic monomers include acrylamides and alkyl-substituted acrylamides, such as acrylamide, methacrylamide, N-tert-butylacrylamide and N-methyl(meth)acrylamide; hydroxyl-substituted acrylamides, such as methylolacrylamide, and beta-hydroxyalkylamides; as well as acrylonitrile and methacrylonitrile.

The latex emulsion (co)polymer may contain one or more monoethylenically-unsaturated acid monomer, such as, for example, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth)acrylate, phosphopropyl (meth)acrylate, and phosphobutyl (meth)acrylate, phosphoalkyl crotonates, phosphoalkyl maleates, phosphoalkyl fumarates, phosphodialkyl (meth)acrylates, phosphodialkyl crotonates, and allyl phosphate. Preferably, the latex emulsion (co)polymer comprises from 5.5% to 35% by weight acid-functional monomers, more preferably 6% to 25%, and even more preferably from 10% to 20%, wherein the acid-functional monomers comprise carboxylic acid groups, anhydride groups, or salts thereof. Low levels of the acid-functional monomer, in particular 5% and lower, result in insufficient crosslinking, whereas higher levels, for example 25% and higher, result in higher overall corrosion rates.

The carboxyl groups of the latex emulsion (co)polymer composition may be neutralized with a base. The neutralization may at least partially occur prior to, or while treating a substrate.

In one embodiment of the invention, the carboxyl groups of the latex emulsion (co)polymer composition may be at least partially neutralized with a fixed base, meaning a base which is substantially non-volatile under the conditions of the treatment such as, for example, sodium hydroxide, potassium hydroxide, sodium carbonate, or t-butylammonium hydroxide. The fixed base is sufficiently nonvolatile that it will substantially remain in the composition during heating and curing operations. Fixed multivalent bases such as, for example, calcium carbonate can tend to destabilize an aqueous dispersion, but can be used in minor amount.

In a different embodiment of the invention, the carboxyl groups may be neutralized with a volatile base, meaning a base which will substantially volatilize during the heating and curing process. Suitable volatile bases for neutralization include, for example, ammonia or volatile lower alkyl amines. The volatile base can be used in addition to the fixed base.

However, the latexes need not be neutralized. The presence of hard base (NaOH or KOH) tends to negatively impact the condensation reaction (ester crosslinking) kinetics. Moreover, when a fugitive base such as ammonium hydroxide (ammonia) or triethylamine is added, the latex swells, and Brookfield viscosities rise. These viscosity effects can be reduced by adding a low level of crosslinker to the latex during polymer synthesis. However, the use of fugitive bases often additionally results in odor problems and/or unacceptable nitrogenous emissions upon thermal treatment. The pH of the aqueous thermosetting composition is no greater than 7.5, preferably no greater than 7.0, more preferably no greater than 6.5, and still more preferably no greater than 6.0.

The latex emulsion (co)polymer may contain copolymerized multi-ethylenically-unsaturated monomers such as, for example, allyl methacrylate, diallyl phthalate, 1,4-butylene glycol dimethacrylate, 1,2-ethylene glycol dimethacrylate, 1,6-hexanediol diacrylate, butadiene, trimethylolpropane triacrylate (TMPTA) and divinyl benzene.

Anionic or nonionic surfactants, or mixtures thereof, can be used in the emulsion polymerization. For some applications, such as those requiring resistance to water sensitivity, the use of polymerizable surfactants (also known as reactive surfactants) can be advantageous; these surfactants are known in the art, as described, for example, in U.S. Patent Publication No. 2003/0149119 or U.S. Patent Publication No. 2001/0031826. The polymerization can be carried out by various means such as, for example, with all of the monomers added to the reaction kettle prior to beginning the polymerization reaction, with a portion of the ethylenically-unsaturated monomer in emulsified form present in the reaction kettle at the beginning of the polymerization reaction, or with a small particle size emulsion polymer seed present in the reaction kettle at the beginning of the polymerization reaction.

The polymerization reaction to prepare the latex emulsion (co)polymer can be initiated by various methods known in the art such as, for example, by using the thermal decomposition of an initiator and by using an oxidation-reduction reaction ("redox reaction") to generate free radicals to effect the polymerization. The latex emulsion (co)polymer can be prepared in water or in solvent/water mixtures such as, for example, i-propanol/water, tetrahydrofuran/water, and dioxane/water.

Chain transfer agents such as mercaptans, polymercaptans, and halogen compounds can be used in the polymerization mixture in order to moderate the molecular weight of the polycarboxy (co)polymer composition. Generally, from 0% to 10% by weight, based on the weight of the polymeric binder, of $C_4$-$C_{20}$ alkyl mercaptans, mercaptopropionic acid, or esters of mercaptopropionic acid, can be used.

The formaldehyde-free curable aqueous composition of this invention may optionally contain a phosphorous-containing cure accelerator which may be a compound with a molecular weight less than about 1000 such as, for example, an alkali metal hypophosphite salt, hypophosphorous acid, an alkali metal phosphite, an alkali metal polyphosphate, an alkali metal dihydrogen phosphate, a polyphosphoric acid, and an alkyl phosphinic acid or it can be an oligomer or polymer bearing phosphorous-containing groups such as, for example, an addition polymer of acrylic and/or maleic acid formed in the presence of sodium hypophosphite (SHP), addition polymers, such as, for example, the emulsion (co)copolymer of the present invention prepared from ethylenically-unsaturated monomers in the presence of phosphorous salt chain transfer agents or terminators and addition polymers containing acid functional monomer residues such as, for example, copolymerized phosphoethyl methacrylate, and like phosphonic acid esters. Copolymerized vinyl sulfonic acid monomers, and their salts can function similarly. The phosphorous-containing species can be used at a level of from 0% to 40%, preferably from 0% to 20%, further preferably from 0% to 15%, more preferably from 0% to 10% by weight based on the combined weight of the latex emulsion (co)polymer and the polyol. We prefer a level of phosphorous-containing accelerator of from about 0.5% to about 5%, by weight based on the combined weight of the latex emulsion (co)polymer and the polyol.

Furthermore, if a phosphorous-containing chain transfer agent is used to polymerize the latex emulsion (co)polymer employed in the curable composition of this invention, the phosphorous-terminated (co)polymer can act as a phosphorous-containing cure accelerator as defined herein. Specifically, the addition polymer may be formed in the presence of phosphorous-containing chain transfer agents such as, for example, hypophosphorous acid and its salts, as is disclosed in U.S. Pat. Nos. 5,077,361 and 5,294,686, which are hereby incorporated herein by reference, so as to incorporate the phosphorous-containing accelerator and the polycarboxy component in the same molecule. The polymerization reaction to prepare such a phosphorous-containing (co)polymer is otherwise similar to that used to prepare other latex emulsion (co)polymers, as described above.

The latex emulsion (co)polymer particles can be made up of two or more mutually incompatible (co)polymers. These mutually incompatible (co)polymers can be present in various morphological configurations such as, for example, core/shell particles, core/shell particles with shell phases incompletely encapsulating the core, core/shell particles with a multiplicity of cores, interpenetrating network particles, and the like. In such cases, at least one of the phases may have a Tg of less than 90° C., in some applications preferably less than 50° C., or less than 40° C., less than 25° C., or even less than 0° C.

The weight average particle diameter of the latex emulsion (co)polymer can be from 80 nanometers to 1000 nanometers, as measured using a Brookhaven BI-90 Particle Sizer. However, polymodal particle size distributions such as those disclosed in U.S. Pat. Nos. 4,384,056 and 4,539,361, hereby incorporated herein by reference, can be employed.

In one embodiment of the invention, and also for applications for which enhanced waterproofing properties are desired of the curable composition, the emulsion polymer of this invention is a predominately hydrophobic emulsion polymer including, as polymerized units, greater than 30%, preferably greater than 40%, more preferably greater than 50%, and also advantageously greater than 60%, by weight, based on the weight of the emulsion polymer solids, of an ethylenically-unsaturated acrylic monomer including a $C_5$ or greater alkyl group. This approach to waterproofing has been disclosed in U.S. Patent Publication No. 20050048212A1. "Acrylic monomer including a $C_5$ or greater alkyl group" means an acrylic monomer bearing an aliphatic alkyl group having five or more C atoms, the alkyl group including n-alkyl, s-alkyl, i-alkyl, and t-alkyl groups. Suitable ethylenically-unsaturated monomers including a $C_5$ or greater alkyl group include ($C_5$-$C_{30}$) alkyl esters of (meth)acrylic acid, such as amyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate; unsaturated vinyl esters of (meth)acrylic acid such as those derived from fatty acids and fatty alcohols; surfactant monomers including long chain alkoxy- or alkylphenoxy(polyalkylene oxide) (meth)acrylates, such as $C_{18}H_{37}$-(ethylene oxide)$_{20}$ methacrylate and $C_{12}H_{25}$-(ethylene oxide)$_{23}$ methacrylate; N-alkyl substituted (meth)acrylamides such as octyl acrylamide; and the like. The monomer including a $C_5$ or greater alkyl group can also contain functionality, such as amido, aldehyde, ureido, polyether and the like, but preferably does not contain an acid or hydroxy group. Emulsion polymers containing such monomers can be prepared by emulsion polymerization, preferably by the method for forming polymers of U.S. Pat. No. 5,521,266.

Blending a predominantly hydrophobic emulsion polymer with the high acid-containing latex can also be employed advantageously. A surfactant may be added to the emulsion polymer before or during the blending of the emulsion polymer with the copolymer composition. Preferably, the surfactant is added in the amount of from 0.5% to 20%, preferably from 2% to 10%, by weight, based on the weight of emulsion polymer solids. Preferred is a surfactant having a HLB value of greater than 15.

A particularly advantageous embodiment of the invention provides a curable thermoset composition comprising an acid-containing emulsion polymer, of Tg~40-80° C., in combination with a β-hydroxyalkylamide such that the ratio of —OH groups to emulsion polymer carboxy groups is 0.5/1.0 to 2.0/1.0, preferably 1.1/1.0, in conjunction with 1% SHP as a phosphorous containing catalyst, and a polyacrylic acid species, of molecular weight ~800-2,500, in an amount of ~1-10%, preferably ~5%, by weight based on the sum of the weight of the emulsion (co)polymer (a) and the weight of the polyacrylic acid (c), all weights being taken on a solids basis. The emulsion polymer described in Example 1 is a suitable composition for this preferred embodiment.

The formaldehyde-free curable aqueous composition may be prepared by admixing the latex emulsion (co)polymer, the polyol, the water soluble polyacid species, and, optionally, the phosphorous-containing accelerator using conventional mixing techniques. In another embodiment a carboxyl- or anhydride-containing latex emulsion (co)polymer and an hydroxy-functional monomer may be present in the same latex emulsion (co)polymer, which latex emulsion (co)polymer would contain both the carboxyl, anhydride, or salts thereof functionality and the hydroxyl functionality. In another embodiment the phosphorous-containing accelerator may be present in the latex emulsion (co)polymer, which latex emulsion (co)polymer may be mixed with the polyol (b). In yet another embodiment, the carboxyl- or anhydride-containing latex emulsion (co)polymer, the hydroxy-functional monomer, and the phosphorous-containing accelerator may be present in the same latex emulsion (co)polymer. Other embodiments will be apparent to one skilled in the art.

The formaldehyde-free curable aqueous composition is a substantially thermoplastic, or substantially uncrosslinked, composition when it is applied to the substrate, although low levels of deliberate or adventitious crosslinking may be present.

The composition of this invention can contain, in addition, conventional treatment components such as, for example, emulsifiers; pigments; fillers or extenders; anti-migration aids; curing agents; coalescents; surfactants, particularly nonionic surfactants; spreading agents; mineral oil dust suppressing agents; biocides; plasticizers; organosilanes; amino silanes; anti-foaming agents such as dimethicones, silicone oils and ethoxylated nonionics; corrosion inhibitors, particularly corrosion inhibitors effective at pH<4 such as thioureas, oxalates, and chromates; colorants; antistatic agents; lubricants; waxes; anti-oxidants; coupling agents such as silanes, particularly Silquest™ A-187 (manufactured by GE Silicones-OSi Specialties, located in Wilton, Conn., USA); Wetlink Silanes from GE (e.g. Wetlink 78), and Dynasylan™ silanes from Degussa particularly, epoxy silanes such as, but not limited to, Dynasylan™ GLYMO and GLYEO; and oligomeric silanes such as HYDROSILυ. Also, polymers not of the present invention; and waterproofing agents such as silicones and emulsion polymers, particularly hydrophobic emulsion polymers containing; as copolymerized units, greater than 30% by weight, based on the weight of the emulsion polymer solids, ethylenically-unsaturated acrylic monomer containing a C5 or greater alkyl group.

The composition of this invention is preferably formaldehyde-free. "Formaldehyde-free" means that the composition is substantially free from formaldehyde, nor does it liberate substantial formaldehyde as a result of drying and/or curing. To minimize the formaldehyde content of the (co)polymer composition it is preferred, when preparing a polymer of the present invention, to use polymerization adjuncts such as, for example, initiators, reducing agents, chain transfer agents, biocides, surfactants, and the like, which are themselves free from formaldehyde, do not generate formaldehyde during the polymerization process, and do not generate or emit formaldehyde during the treatment of a substrate. Likewise, it is preferable that any formulation additives be similarly formaldehyde free. "Substantially free from formaldehyde" means that when low levels of formaldehyde are acceptable in the waterborne composition or when compelling reasons exist for using adjuncts which generate or emit formaldehyde, substantially formaldehyde-free waterborne compositions can be used.

The composition of this invention may be used for treating various substrates. Such treatments can be commonly described as, for example, coating, sizing, saturating, bonding, combinations thereof, and the like. Typical substrates include wood, including, for example, solid wood, wood particles, fibers, chips, flour, pulp, and flakes; metal; plastic; fibers such as polyester, glass fibers; woven and non-woven fabrics; and the like and their composite fibers. The (co) polymer blend composition can be applied to a substrate by conventional techniques such as, for example, air or airless spraying, padding, saturating, roll coating, foam coating, curtain coating, beater deposition, coagulation, or the like.

In one embodiment of this invention, the composition can be used as a binder for heat-resistant non-woven fabrics such as, for example, non-wovens which contain heat-resistant fibers such as, for example, aramid fibers, ceramic fibers, metal fibers, carbon fibers, polyimide fibers, certain polyester fibers, rayon fibers, rock wool, and glass fibers. "Heat-resistant fibers" mean fibers which are substantially unaffected by exposure to temperatures above 125° C. Heat-resistant non-wovens can also contain fibers which are not in themselves heat-resistant such as, for example, certain polyester fibers, rayon fibers, nylon fibers, and super-absorbent fibers, in so far as they do not materially adversely affect the performance of the substrate.

The non-woven fabrics incorporating a (co)polymer composition should substantially retain the properties contributed by the cured aqueous composition such as, for example, tensile strength, and not substantially detract from essential non-woven fabric characteristics. The cured composition should not be too rigid or brittle, or become sticky under processing conditions.

The curable aqueous (co)polymer composition, after it is applied to a substrate, is heated to effect drying and curing. "Curing" herein means a thermosetting reaction upon heat treatment. The duration and temperature of heating will affect the rate of drying, processability, handleability; and property development of the treated substrate. Heat treatment at from 120° C. to 400° C. for a period of time between from 3 seconds to 15 minutes can be carried out; treatment at from 175° C. to 225° C. is preferred. A "curable aqueous composition" herein means an aqueous composition that requires heat treatment to at least 100° C. in order to effect the cure. The drying and curing functions can be performed in two or more distinct steps, if desired. For example, the composition can be first heated at a temperature and for a time sufficient to substantially dry but not to substantially cure the composition, and then heated for a second time at a higher temperature and/or for a longer period of time to effect curing. Such a procedure, referred to as "B-staging," can be used to provide binder-treated nonwoven, for example, in roll form, which can at a later stage be cured, with or without forming or molding into a particular configuration, concurrent with the curing process.

The heat-resistant non-wovens can be used for applications such as, for example, insulation batts or rolls, as reinforcing mat for roofing or flooring applications, as roving, as microglass-based substrate for printed circuit boards or battery separators, as filter stock (e.g. for air duct filters), as tape stock, and as reinforcement scrim in cementitious and non-cementitious coatings for masonry, in ceiling tiles, cellulosic roofing tiles, window treatments, wall coverings, molded parts, for curly pulp modification, for powder coating, and the like.

The non yellowing flexible binders of the invention are also useful for bonding wood chips, abrasive matts, decorative laminate paper, laminating adhesives, filtration paper, or cotton rag bonding for automotive sound insulation.

EXAMPLES

Example 1

Synthesis of Acid-Containing Latex Emulsion Copolymer—56 St/29 BA/15 AA

A 1 L four necked round bottom flask, equipped with overhead stirrer, condenser and thermocouple was charged with 335.0 g deionized water and 0.586 g of sodium lauryl ether sulfate surfactant (a 30% aqueous solution). While this initial charge was heating to 85° C., a monomer emulsion consisting of 65.0 g deionized water, 5.27 g of sodium lauryl ether sulfate surfactant (a 30% aqueous solution), 197.0 g of styrene, 102.0 g of butyl acrylate, and 52.5 g of acrylic acid was prepared. Once the initial charge reached the set temperature of 85° C. a 30.0 g aliquot of the monomer emulsion was added to the reaction flask followed by a solution of 0.5 g of ammonium persulfate in 18.0 g of deionized water. After an exotherm was observed the remainder of the monomer emulsion as well as a solution of 1.30 g of ammonium persulfate in 44.0 g of deionized water were gradually added to the reaction flask over 120 minutes while maintaining the temperature at 94-96° C. After the addition of the monomer emulsion and ammonium persulfate solution was complete, the reaction mixture was held at 95° C. for 5 minutes. A solution of 0.17 g of ammonium persulfate in 5.0 g of deionized water was added. After 10 minutes the reaction mixture was allowed to cool. A solution of 2.33 g of 0.15% $FeSO_4$-$7H_2O$ (aq.) was added with 2.0 g of deionized water. As the reaction mixture cooled a solution, of 0.46 g of isoascorbic acid in 8.0 g of deionized water and a solution of 1.36 g of tert-butyl hydroperoxide (70%) in 8.0 g of deionized water gradually added over 30 minutes. The reaction mixture was then allowed to cool to below 30° C. and filtered. A total of 1.49 g of coagulum was collected. The filtered latex had a solids content of 37.54% and a pH of 2.10. The latex particles had a number average diameter of 208.7 nm as measured by capillary hydrodynamic fractionation.

Similar procedures were used to synthesize the other acid-containing latex emulsion (co)polymers used in Tables 1 and 3-6.

Example 2

Synthesis of Water Soluble Polyacid Polymer

Polyacrylic Acid, "pAA"

The polymers produced with this procedure were used as the resin composition in the comparative examples in Table 2, and as the water soluble polyacid dispersant species in Tables 4-7 below. To a three liter four-neck flask equipped with a mechanical stirrer, a condenser, a nitrogen sweep, a thermometer and inlets for the gradual additions of monomer, initiator and sodium hypophosphite solutions, was added 710 grams of deionized water. A chain regulator stock solution was prepared by dissolving 1250 grams of sodium hypophosphite monohydrate in 1528 grams of deionized water. A total of 243.2 grams was removed from the stock solution and half (121.6) of this solution was added to the water charge and heated to 93° C. The remaining half of the chain regulator solution was used as co-feed solution. A monomer charge of 1216 grams of glacial acrylic acid was prepared. An initiator solution was prepared by dissolving 12.16 grams of sodium persulfate in 30.7 grams of DI water.

The acrylic acid, sodium persulfate and sodium hypophosphite (SHP) charges were added linearly and separately over two hours to the stirring water charge. Temperature was maintained at 93°±1° C.

The resultant polymer solution was allowed to cool to room temperature and diluted with 274 grams of deionized water. The solution had a solids content of 52.7%, pH of 3.2, viscosity of 210 centipoises (measured on a Brookfield LVF viscometer, #4 spindle at 100 rpm) and residual monomer content of less than 0.01%. Using this procedure, the weight average (Mw) molecular weight by gel permeation chromatography (GPC, using a polyacrylic acid standard for calibration) was 2456, or, over multiple runs, approximately 2500. This material was used as the resin composition in Table 2 (below).

The same procedure was used to generate the lower molecular weight pAA dispersant material (used in Tables 4 and 5), except the SHP was added at a level of 18%, by weight, of the weight of acid (instead of 9%). This latter procedure resulted in pAA of weight average molecular weight ~900-1,000.

Example 3

Aqueous Curable Thermoset Compositions

Acid-Containing Latex Emulsion Copolymer+Polyols

A series of aqueous curable thermoset compositions were prepared using the high acid containing latex emulsion (co)polymer of the type described in Example 1 along with polyols, such as beta-hydroxyalkylamides or triethanolamine, which function as crosslinkers. The OH/COOH ratio of these curable thermosets varies; for the samples in Table 1, it is either 0.5/1.0 or 1.1/1.0, as indicated. Each sample was prepared with and without sodium hypophosphite (SHP), which may function as a catalyst.

The aqueous curable thermoset compositions were prepared by simply admixing the high acid-containing latex emulsion (co)polymer (Mw~$10^5$-$10^6$; lower molecular weights can be accessed using, for example, chain transfer agents, such as n-dodecyl mercaptan, n-DDM) with the polyol crosslinker, Amide 1 or triethanolamine, and the accelerant, sodium hypophosphite solution, with stirring. The pH of the mixture was typically ~2.6-3.0 (before any neutralization).

The compositions of the aqueous curable thermosets presented in Tables 2-6 (below) were prepared similarly.

TABLE 1

Composition of aqueous curable thermosets (weight percent):

| Latex # | Description Latex[1]/Polyol Crosslinker[2]/Accelerant[3] | Weight fraction latex solids | Weight fraction crosslinker solids | Weight fraction SHP solids |
|---|---|---|---|---|
| 1 | Latex (15AA)/Amide1[4] (0.5 OH:acid)/9 SHP | 91.9 | 6.9 | 1.2 |
| 2 | Latex (15AA)/Amide1 (0.5 OH:acid)/no SHP | 93.1 | 6.9 | |
| 3 | Latex (15AA)/TEOA[5] (0.5 OH:acid)/9 SHP | 94.0 | 4.8 | 1.2 |
| 4 | Latex (15AA)/TEOA (0.5 OH:acid)/no SHP | 95.2 | 4.8 | |
| 5 | Latex (15AA)/Amide1 (1.1 OH:acid)/9 SHP | 85.0 | 13.9 | 1.1 |
| 6 | Latex (15AA)/Amide1 (1.1 OH:acid)/no SHP | 85.9 | 14.1 | |
| 7 | Latex (15AA)/TEOA (1.1 OH:acid)/9 SHP | 88.9 | 9.9 | 1.2 |
| 8 | Latex (15AA)/TEOA (1.1 OH:acid)/no SHP | 90.0 | 10.0 | |
| 9 | Latex (25AA)/Amide1 (0.5 OH:acid)/9 SHP | 87.3 | 10.8 | 1.9 |
| 10 | Latex (25AA)/Amide1 (0.5 OH:acid)/no SHP | 89.0 | 11.0 | |
| 11 | Latex (25AA)/TEOA (0.5 OH:acid)/9 SHP | 90.4 | 7.6 | 2 |
| 12 | Latex (25AA)/TEOA (0.5 OH:acid)/no SHP | 92.2 | 7.8 | |
| 13 | Latex (25AA)/Amide1 (1.1 OH:acid)/9 SHP | 77.2 | 21.1 | 1.7 |
| 14 | Latex (25AA)/Amide1 (1.1 OH:acid)/no SHP | 78.5 | 21.5 | |
| 15 | Latex (25AA)/TEOA (1.1 OH:acid)/9 SHP | 82.8 | 15.4 | 1.8 |
| 16 | Latex (25AA)/TEOA (1.1 OH:acid)/no SHP | 84.3 | 15.7 | |

[1] latex contains either 15 or 25 weight percent acrylic acid (AA) monomer (see, for example, Table 3 compositions).

[2] polyol crosslinker added to latex in terms of mole —OH polyol:mole —COOH latex

[3] SHP added as a weight percent on AA weight (e.g. 9 SHP refers to 9%, by weight, of the weight of acid, which in Latex Sample 1 is equivalent to 1.2%, by weight, based on solids, of the total weight of latex, polyol crosslinker, and accelerant).

[4] Amide1 is the β-hydroxyalkylamide resulting from the adduct of caprolactone and diethanolamine.

[5] TEOA is triethanolamine.

Example 4

Evaluation of Corrosivity for Aqueous Curable Thermoset Compositions

In the data presented in the tables below, the tests to measure corrosion use a 0.5% solids aqueous solution of the emulsion polymer/polyacid species in order to mimic the wash water which is recycled during the product manufacturing process. The recycled wash water is acidic resulting in an accelerated rate of corrosion of the equipment, unless measures are taken to minimize this effect. Higher concentrations of the emulsion polymer/polyacid species in the recycled water result in higher levels of corrosion.

Laboratory corrosion testing was carried out following the general guidelines provided by ASTM Designation: G 31-72 "Standard Practice for Laboratory Immersion Corrosion Testing of Metals". Multiple testing apparatuses consisting of a 1 liter flask, a stirring mechanism, a commercially available test specimen and holder, and the desired test solution were arranged within a standard laboratory bench hood. Testing consisted of rotating the test specimens (ca. 4 in$^2$ area, MS-1010 carbon steel coupons, from Metal Samples Company, Munford, Ala., USA) at moderate agitation (55 rpm), in the test solution (typically 0.5% solids in deionized water), for 48 hours at ambient temperature. Upon completion of testing, test samples were removed from the solution, cleaned with Bon Ami™ kitchen cleanser/scrub brush for 1 min, and rinsed with acetone. Test samples were evaluated by calculating a corrosion rate, based on weight loss, and by a visual inspection for localized corrosion using a light microscope. Under these test conditions, low dynamic corrosion rates are less than about 30 mil/yr, and most preferably less than about 15 mil/yr.

Polyacids such as polyacrylic acid (pAA) can function in the esterification reaction with polyols, but these compositions exhibit corrosion as shown by, for example Comparative Example 1 (C1) below (Table 2). Such compositions can operate without corrosion if the polyacid species is neutralized, to pH 8 or higher, however fugitive bases like ammonium hydroxide can result in an extremely strong and undesirable ammonia odor, and fixed bases tend to negatively impact the condensation reaction (ester crosslinking) kinetics, and so both types of bases are undesirable. More generally, any significant neutralization can result in unacceptable odor and/or unacceptable nitrogenous emissions upon thermal treatment. Moreover, similar problems can exist if certain water-soluble (i.e. neutralized) dispersants are used as the source of acid functionality (e.g. Comparative Example C4).

TABLE 2

Corrosion rates for water soluble polyacid compositions.

| Sample | Resin Composition[1] | Crosslinker[2] | pH | Corrosion Rate (mil/yr) | Evaluation |
|---|---|---|---|---|---|
| C1 | pAA | 0.55 TEOA | 3.1 | 94 | uniform corrosion |
| C2 | pAA | 0.55 TEOA | 9.0 | 0 | no corrosion - Odor |
| C3 | pAA | 0.55 Amide1 | 9.0 | 0 | no corrosion - Odor |
| C4 | Dispersant copolymer[3] | 0.55 Amide2 | 8.6 | 0 | no corrosion - Odor |

[1]The pAA in this Table has a molecular weight of ~2,500 (see Example 2).

[2]The level of crosslinker, e.g. 0.55 TEOA, refers to the use of an amount of TEOA that corresponds to a ratio of 0.55 —OH functionality of the TEOA to 1.0 acid functionality of the resin composition, polyacrylic acid (pAA). Amide1 is the β-hydroxyalkylamide resulting from the adduct of caprolactone and diethanolamine. Amide2 is the β-hydroxyalkylamide resulting from the adduct of butyrolactone and diethanolamine.

[3]Dispersant copolymer = 50:50 molar ratio of diisobutylene:maleic anhydride.

In addition to having a high corrosion rate, sample C1 results in a highly colored (red/brown) solution, the color also being indicative of the extent of corrosion. Amide 1 is not shelf stable at or below pH~3.

High acid-containing latex emulsion polymers can also function as the source of acid for the esterification reaction to produce heat curable thermosets.

TABLE 3

Corrosion rates for acid-containing latex emulsion polymer compositions.

| Sample | Resin Composition[1] (Latex) | Crosslinker | pH | Corrosion Rate (mil/yr) | Evaluation |
|---|---|---|---|---|---|
| C5 | 85St/15AA | 1.1 Amide1 | 5.5 | 12 | under deposit pitting |
| C6 | 85St/15AA | 1.1 Amide1 | 8.1 | 22 | under deposit pitting |
| C7 | 85St/15AA (0.2ALMA) | 1.1 Amide1 | 7.8 | 7 | under deposit pitting |
| C8 | 75St/25AA | 1.1 Amide1 | 7.0 | 101 | pitting |
| C9 | 75St/25MAA | 1.1 Amide1 | 7.0 | 142 | gross pitting |

[1]St is styrene; AA is acrylic acid; MAA is methacrylic acid; ALMA is allylmethacrylate.

Although the overall corrosion rate for samples $C_5$-$C_7$ is not as worrisome as the solution polyacids, the localized corrosion that occurs under deposits of emulsion polymer on the metal causes localized pitting in the metal and is unacceptable. Higher acid content latex emulsion polymers show much higher corrosion rates (see, for example, C8 and C9, Table 3). Higher levels of Amide1 (not shown) do not eliminate the pitting.

TABLE 4

Corrosion rates for acid-containing latex compositions with added dispersant.

| Sample | Resin Composition | Dispersant[1] | Crosslinker | pH | Corrosion Rate (mil/yr) | Evaluation |
|---|---|---|---|---|---|---|
| Acidic | | | | | | |
| C10 | 85St/15AA/0.2ALMA | (none) | 0.7 Amide1 | 4.3 | 19 | pitting |
| Ex. 1 | 85St/15AA/0.2ALMA | 3.3 pAA | 0.7 Amide1 | 3.9 | 23 | uniform corrosion |
| Ex. 2 | 85St/15AA/0.2ALMA | 6.6 pAA | 0.7 Amide1 | 3.5 | 28 | uniform corrosion |
| C11 | 85St/15AA/0.2ALMA | 13.1 pAA | 0.7 Amide1 | 3.5 | 34 | uniform corrosion |
| Neutral. | | | | | | |
| C12 | 85St/15AA/0.2ALMA | (none) | 0.7 Amide1 | 6.2 | 20 | under deposit corrosion |
| Ex. 3 | 85St/15AA/0.2ALMA | 6.6 pAA | 0.7 Amide1 | 6.5 | 7 | uniform corrosion |

[1]The resin and dispersant sum to 100 parts (e.g. in Ex. 1, the dispersant level is 3.3% by weight based on the total weight of resin and dispersant). The molecular weight of the pAA dispersant in this Table is ~1,100-1,300.
[2]Examples C12 and Ex. 3 are neutralized with ammonium hydroxide solution.

Low levels of polyacid function as a dispersant when added to latex emulsion formulations. The data in Table 4 show that the addition of a polyacrylic acid dispersant can result in uniform corrosion, as opposed to the more undesirable localized pitting. However, the corrosion rates for these compositions with added polyacid tend to be a little higher. Improvement in the corrosion rate, and uniform corrosion, can be seen if these compositions are neutralized (e.g. Ex. 3), although such an approach is undesirable for the reasons discussed above. Comparative Example C10 and C12 show that pitting and/or under deposit corrosion occurs in the absence of the polyacid dispersants.

Table 5 demonstrates that a number of dispersant species can be employed advantageously to effect low corrosion rates without pitting or under deposit corrosion. Levels of dispersant as low as 1% are effective. Higher levels of the pAA polyacid dispersant result in higher corrosion rates (e.g. see Ex. 4, Ex. 5, and C14).

The 85St/15AA polymer composition has a Tg~115° C. (midpoint of transition, by DSC, as described above), which is favorable for most non-woven end products. However, some end-use applications for the curable thermoset compositions require some degree of flexibility, for which it is desirable to use polymer compositions of a lower Tg, or of a lower molecular weight (or both). Molecular weight reduction is effected by the use of n-dodecylmercaptan (nDDM) as a chain transfer agent in the polymerization. Softer (lower Tg) polymers are prepared by replacing some amounts of styrene (St) with butyl acrylate (BA) in the latex emulsion polymerization. Thus, similar experiments were performed with softer latex polymer compositions (56St/29BA/15AA, Tg~71° C.; 41St/44BA/15AA, Tg~31° C.), and with lower molecular weight latex polymer compositions (85St/15AA/1nDDM, Mw~49,000; 72St/13BA/15AA/1 nDDM, Mw~45,000; 56St/29BA/15AA/0.2nDDM, Mw~123,000). The general trends seen in the corrosion data are similar to those

TABLE 5

Corrosion rates for acid-containing latex compositions with different dispersants.

| Sample | Resin Comp. | Dispersant[1] | Crosslinker | pH | Corrosion Rate (mil/yr) | Evaluation |
|---|---|---|---|---|---|---|
| C13 | 85St/15AA | (none) | 1.1 Amide1 | 4.9 | 50 | localized pitting |
| Ex. 4 | 85St/15AA | 1.1 pAA | 1.1 Amide1 | 3.9 | 19 | uniform corrosion |
| Ex. 5 | 85St/15AA | 5.6 pAA | 1.1 Amide1 | 3.5 | 24 | uniform corrosion |
| C14 | 85St/15AA | 11.1 pAA | 1.1 Amide1 | 3.3 | 30 | uniform corrosion |
| Ex. 6 | 85St/15AA | 1.2 $H_3PO_4$ | 1.1 Amide1 | 3.1[2] | 10 | uniform corrosion |
| Ex. 7 | 85St/15AA | 1.2 $NaH_2PO_4$ | 1.1 Amide1 | 4.8 | 18 | uniform corrosion |
| Ex. 8 | 85St/15AA | 1.2 $(NH_4)_2HPO_4$ | 1.1 Amide1 | 5.8 | 14 | uniform corrosion |
| Ex. 9 | 85St/15AA | 1.2 Na Citrate | 1.1 Amide1 | 5.3 | 13 | uniform corrosion |

[1]The resin and dispersant sum to 100 parts (e.g. in Ex. 5, the dispersant level is 5.6% by weight based on the total weight of resin and dispersant). The molecular weight of the pAA dispersant in this Table is ~1,100-1,300.
[2]Example 6 was adjusted to pH 5 (using $NH_4OH$) prior to testing; the others were not adjusted before testing.

described above; specifically, in the absence of dispersants, all compositions suffer from under deposit corrosion and/or pitting, the latter problems being absent when dispersants are included as described above.

In Table 6, Comparative C15 shows under deposit corrosion in the absence of dispersant and Amide 1. Comparative C16 utilizes dispersant, but no Amide 1, and results in only slight under deposit corrosion. Pitting occurs using Amide1, but no dispersant (Comparative C17). However, Example 10, with both dispersant and Amide1, shows no pitting and has uniform corrosion at an acceptable rate. Although the use of dispersant is required in order to see acceptable performance, the use of Amide1 in conjunction with the dispersant is preferable. Not shown, the beneficial effects of the invention are also seen when mixed crosslinker systems are employed (e.g. Amide1 with TEOA, or Amide1 with Amide2).

TABLE 6

Corrosion rates for compositions varying pAA dispersant and amide1 crosslinker.

| Sample | Resin Composition[1] | Dispersant[1] | Crosslinker | pH | Corrosion Rate (mil/yr) | Evaluation |
|---|---|---|---|---|---|---|
| C15 | 85St/15AA | none | none | 3.7 | 25 | under deposit corrosion |
| C16 | 85St/15AA | 5.6 pAA | none | 3.4 | 27 | uniform/slight under deposit corrosion |
| C17 | 85St/15AA | none | 1.1 Amide1 | 4.8 | 9 | pitting corrosion |
| Ex. 10 | 85St/15AA | 5.6 pAA | 1.1 Amide1 | 3.4 | 26 | uniform corrosion |

[1]The resin and dispersant sum to 100 parts. e.g. in Ex. 10, the dispersant level is 5.6% by weight based on the total weight of resin and dispersant. The weight average molecular weight of the pAA dispersant in this Table is ~2,200-2,400.

Example 5

Measurement of Total Solids by Weight

Where we have measured total solids by weight, we used the ASTM D-2369 method as follows.

Procedure:

1. Weigh aluminum dish to the 4th decimal place. Record this weight.
2. Weigh out appropriately 0.5 grams of sample and record the weight of the dish and sample to the 4th decimal place. Note that the sample should be distributed over the dish surface: a few drops of water can be used to aid in distributing the sample. Determination should be done in duplicate. Place the sample in a 150° C. oven for 30 minutes.
3. Remove the sample from the oven wearing leather gloves or with tongs and allow to cool to room temperature in a constant temperature and constant humidity room (25+/−3° C.; 50+/−5% relative humidity) for approximately 2 minutes.
4. Weigh and record the aluminum dish and polymer to the 4th decimal place.
5. Use the equations below to determine the percent solids (% Solids):

Before Drying (weight of dish and wet sample)−(weight of dish)= (weight of wet sample)

After Drying (weight of dish and polymer)−(weight of dish)= (weight of polymer)

Then:

% Solids=100×(weight of polymer)/(weight of wet sample)

I claim:

1. An aqueous thermosetting composition comprising
   (a) polymer particles of at least one emulsion copolymer comprising from 10% to 20% by weight of one or more monomers comprising carboxylic acid groups, or anhydride groups thereof in copolymerized form;
   (b) at least one polyol, wherein the polyol has a formula molecular weight of less than 2000 and at least two hydroxyl groups, and wherein the ratio of the number of equivalents of hydroxyl groups of said polyol to the number of equivalents of said carboxylic acid groups, anhydride groups, or salts thereof of said at least one emulsion (co)polymer is from 10/1 to 1/10; and
   (c) at least one water-soluble polyacid or salt thereof chosen from polycarboxy (co)polymers; citric acid; phosphorous-containing acids; salts thereof; and mixtures thereof in an amount no greater than 10%, by weight based on the sum of the weight of the emulsion copolymer (a) and the weight of the water-soluble polyacid or salt thereof, all weights being taken on a solids basis;
   wherein the aqueous thermosetting composition has a weight ratio of (a) to combined weights of (a), (b), and (c), of greater than 0.5:1.0, based on the weights of solids of each component; and
   wherein the pH of the aqueous thermosetting composition is no greater than 7.5.

2. The aqueous thermosetting composition of claim 1 wherein the emulsion copolymer (a) has a glass transition temperature, Tg, of less than 90° C., as determined by the Fox equation.

3. The aqueous thermosetting composition of claim 1 wherein the water-soluble polyacid or salt thereof (c) is a poly(meth)acrylic acid species.

4. The aqueous thermosetting composition of claim 1 wherein the water-soluble polyacid or salt thereof (c) is selected from the group consisting of phosphorous-acids and their salts, citric acid and its salts, and mixtures thereof.

5. The aqueous thermosetting composition of claim 1 wherein the polyol (b) is selected from the group consisting of β-hydroxyalkylamides, dialkanolamines, trialkanolamines, dialkanols, and trialkanols.

6. The aqueous thermosetting composition of claim 1 wherein the polyol (b) is the β-hydroxyalkylamide resulting from the adduct of caprolactone and diethanolamine.

7. The aqueous thermosetting composition of claim 1 further comprising a phosphorous-containing accelerator.

8. The aqueous thermosetting composition of claim 1 wherein components (a), (b) and (c) together make up at least 50 weight % of the total solids of the aqueous thermosetting composition.

9. A method for treating substrates comprising:
   (i) forming an aqueous thermosetting composition comprising admixing with water or one or more aqueous solvent (a) at least one emulsion copolymer comprising from 10% to 20% by weight of one or more monomers comprising carboxylic acid groups, or anhydride groups thereof in copolymerized form;
   (b) at least one polyol having a formula molecular weight of less than 2000 and at least two hydroxyl groups, and wherein the ratio of the number of equivalents of hydroxyl groups of the polyol(s) to the number of equivalents of said carboxylic acid groups, anhydride groups, or salts thereof of the emulsion (co)polymer(s) is from 10/1 to 1/10; and (c) at least one water-soluble polyacid or salt thereof chosen from polycarboxy (co)polymers; citric acid; phosphorous-containing acids; salts thereof; and mixtures thereof, in an amount no greater than 10%, by weight based on the sum of the weight of the emulsion (co)polymer (a) and the weight of the water-soluble polyacid or salt thereof, all weights being taken on a solids basis;

wherein the aqueous thermosetting composition has a weight ratio of (a) to combined weights of (a), (b), and (c), of greater than 0.5:1.0, based on the weights of solids of each component; and wherein the pH of the aqueous thermosetting composition is no greater than 7.5;

(ii) contacting said substrate with said aqueous thermosetting composition or, alternatively, applying said aqueous thermosetting composition to said substrate; and (iii) heating said aqueous thermosetting composition at a temperature of from 100° C. to 400° C.

* * * * *